May 18, 1965   T. J. REED   3,184,036
FLOW DIVERTING MECHANISM FOR VERTICALLY DISPOSED CONVEYOR TUBES
Filed April 9, 1962
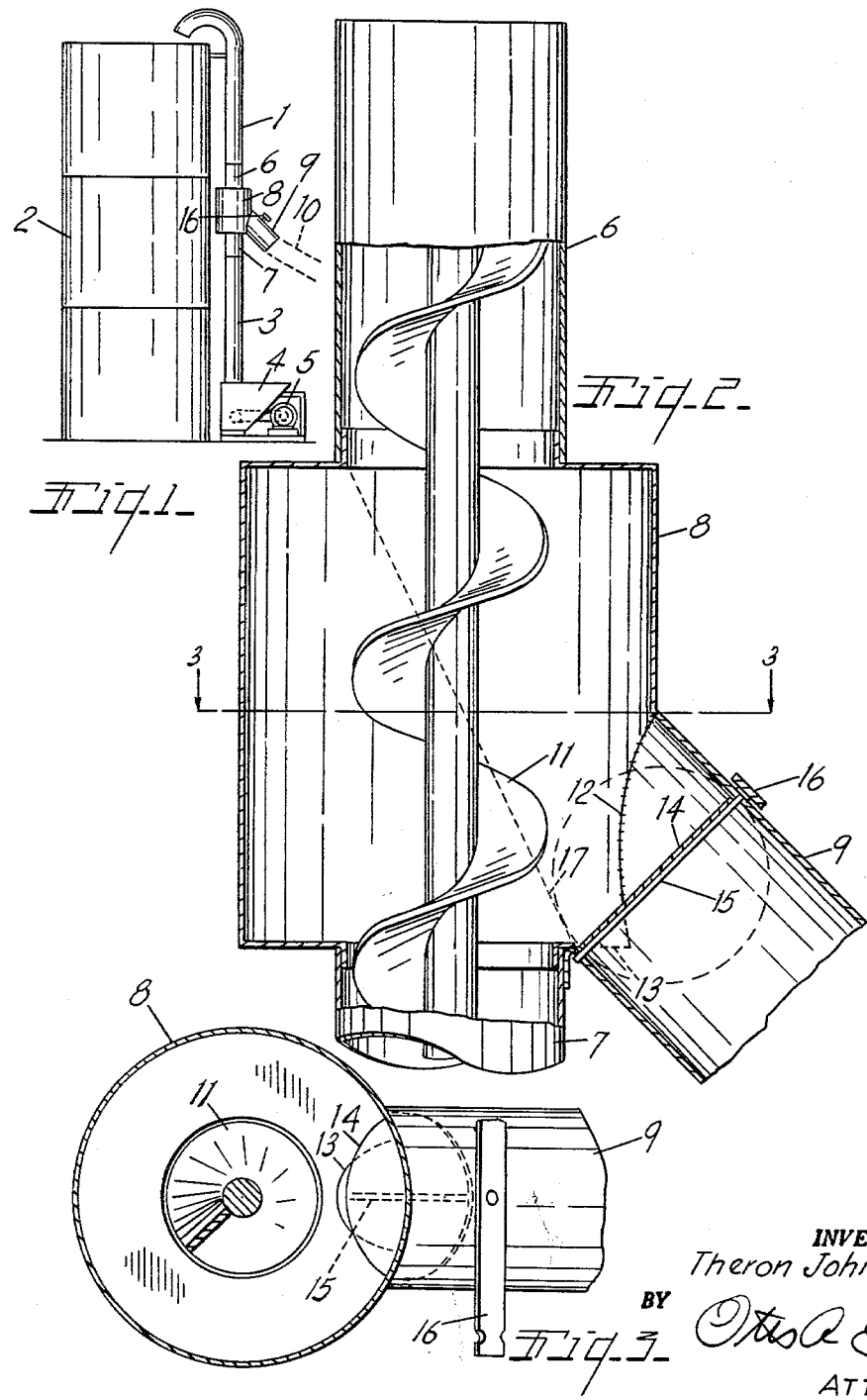
INVENTOR.
Theron John Reed
BY
Otts A. Earl
ATTORNEY.

United States Patent Office 3,184,036
Patented May 18, 1965

3,184,036
FLOW DIVERTING MECHANISM FOR VERTI-
CALLY DISPOSED CONVEYOR TUBES
Theron John Reed, Burr Oak, Mich., assignor, by mesne
assignments, to American Planter Co., Burr Oak, Mich.,
a corporation of Michigan
Filed Apr. 9, 1962, Ser. No. 185,917
5 Claims. (Cl. 198—68)

This invention relates to improvements in flow diverting mechanism for vertically disposed conveyor tubes. The principal objects of this invention are:

First, to provide flow diverting mechanism including a selectively operable valve for diverting part or all of the material being elevated through a vertically delivering screw elevator at a point below the top of the elevator.

Second, to provide flow diverting mechanism for a vertically driving screw elevator which will not interfere with the full delivery capacity of the elevator when the diverting mechanism is closed, and which will not subject the screw auger of the vertical elevator to unbalanced lateral loads.

Third, to provide flow diverting mechanism which is relatively inexpensive and which can be installed in any vertically and angularly varied position in a vertical screw conveyor.

Other objects and advantages of the invention will be apparent from a consideration of the following description and claims. The drawings, of which there is one sheet, illustrate a highly pracitcal form of the flow diverting mechanism.

FIG. 1 is a side elevational view of a vertical screw elevator having the flow diverting mechanism of the invention installed therein.

FIG. 2 is a fragmentary enlarged elevational view partially in vertical cross section showing the flow diverting mechanism.

FIG. 3 is a fragmentary, horizontal, cross sectional view taken along the plane of the line 3—3 in FIG. 2.

FIG. 1 illustrates a vertically delivering screw elevator having an upper portion 1 delivering into a bin or silo 2 and a lower portion 3 receiving material from a hopper 4 for elevation into the silo. A motor for driving the elevator is conventionally illustrated at 5. Interposed between the upper portion 1 and lower portion 3 of the screw elevator is the flow diverting mechanism of the invention consisting generally of an upper connecting tube 6 and lower connecting tube 7 opening from opposite ends of an enlarged cylindrical drum 8. A downwardly and laterally inclined flow diverting tube 9 opens from the bottom of the drum 8. It will be appreciated that the drum 8 can be installed in any vertically adjusted position in the elevator 1–3 and in any angularly adjusted position therein. The flow diverting tube 9 may discharge directly into any receiver positioned therebelow or may be connected to a tube indicated by the dotted lines 10 for further directing the diverted material.

As appears more clearly in FIGS. 2 and 3 the connecting tubes 6 and 7 are approximately the same diameter as the upper and lower portions 1 and 3 of the screw elevator and enclose a length of screw auger 11 which may be part of the screw elevator in the elevator 1–3 or may be a separate section of auger connectable thereto. The enlarged drum 8 is generally cylindrical in shape and is desirably somewhat less than twice the diameter of the connecting tubes 6 and 7. The ratio disclosed in the drawings is of the order of 28 to 30. The length of the cylindrical drum may be varied somewhat depending upon the free flowing properties of the material to be conveyed and directed. For most dry agricultural commodities the height of the drum 8 is somewhat more than twice the diameter of the connecting tubes 6 and 7. The ratio disclosed in the drawings is about 33 to 30. The inclined diverting tube 9 is at least as large as the connecting tubes 6 and 7 to accommodate the full flow of the vertical elevator.

The flow diverting tube 9 intersects and opens to the inside of the drum 8 along the line 12 along the side of the drum and along the line 13 in the bottom of the drum where the drum projects beyond the side of the lower connecting tube 7. A manually operative value such as the circular damper 14 is mounted on an oblique shaft 15 extending diametrically across the flow diverting tube 9. A manually operable lever 16 on the upper end of the shaft is arranged to open and close the valve as desired.

In operation of the auger 11 in the drum 8 and elevating tube 1–3 with the valve 14 closed, the interior of the drum 8 is quickly filled with the material being elevated and further material is elevated directly from the tube 7 to the tube 6 by the screw 11 with the filling material in the drum acting as the sides of the elevating duct. The lateral forces exerted by the material being elevated are distributed equally around the circumference of the auger and the vertical elevator tube. When the valve 14 is opened the accumulated material in one side of the drum 8 flows immediately by gravity through the opening defined by the lines 12 and 13 and material subsequently elevated into the drum 8 by the auger 11 is permitted to escape from the side of the auger over the flow diverting tube for delivery through the tube 9. Depending upon the angle of repose of the material being elevated some material will remain on the left side of the auger 11 within the drum 8 to form a wall around the auger opposite from the flow diverting tube so that any material ejected radially from the auger at different vertically and angularly varied positions along the auger flows by gravity along the inclined surface of repose of the retained material and into the diverting tube 9. The height of the drum 8 is determined by the angle of repose of the most stable material to be handled so that an inclined line from the inner edge of the elliptical opening 13 to the opposite edge of the upper connecting tube 6 as indicated by the dotted line 17 will be at at least as great an angle as the angle of repose of the material being handled.

The flow diverting mechanism thus functions to permit full flow through the elevator 1–3 without increased load and alternatively to permit diversion of the full flow of the elevator through the flow diverting tube 9.

What is claimed as new is:

1. Flow diverting valve mechanism for a vertically disposed conveyor tube with a screw auger therein comprising,
   an enlarged cylindrical drum interposed in said tube and concentrically about the auger therein and projecting beyond the sides of said tube,
   a diverted flow tube of approximately the same diameter as said conveyor tube obliquely intersecting the side and bottom of said drum and extending laterally to the side of the lower portion of said conveyor tube and opening into said drum and extending downwardly therefrom,
   and a damper valve positioned in said flow tube adjacent the upper end thereof and arranged to selectively open and close said flow tube,
   the diameter of said drum being slightly less than twice the diameter of said conveyor tube and the vertical length of said drum being slightly more than twice the diameter of said conveyor tube and equal to at least one pitch length of the auger.

2. Flow diverting valve mechanism for a vertically disposed conveyor tube with a screw auger therein comprising,
   an enlarged drum interposed in said tube and concentrically about the auger therein and projecting beyond the sides of said tube and extending vertically for at least one pitch length of said auger, a diverted flow tube of approximately the same cross sectional area as the cross sectional area of said conveyor tube obliquely intersecting the side and bottom of said drum and extending laterally to the side of the lower portion of said conveyor tube and opening into said drum and extending downwardly therefrom, and a damper valve positioned in said flow tube adjacent the upper end thereof and arranged to selectively open and close said flow tube.

3. Flow diverting valve mechanism for a vertically disposed conveyor tube with a screw auger therein comprising, means forming an enlarged chamber interposed in said tube and concentrically about the auger therein and projecting beyond the sides of said tube and extending vertically for at least one pitch length of said auger, a diverted flow tube of approximately the same cross sectional area as the cross sectional area of said conveyor tube obliquely intersecting the side and bottom of said chamber and extending laterally to the side of the lower portion of said conveyor tube and opening into said chamber and extending downwardly therefrom, and a valve positioned in said flow tube and arranged to selectively open and close said flow tube.

4. In combination with an upright screw conveyor having a conveyor tube with a helical screw auger rotatably mounted therein in close material advancing relation to the inside of said tube, material retaining means located intermediate of the ends of said tube and said auger and extending along one pitch turn of said auger and therearound, said retaining means being radially enlarged and more widely spaced from said auger than said tube providing space for material to be thrown radially by said auger and clear of the auger, an intermediate material diverting tube of equal cross sectional area to said conveyor tube disposed in downwardly directed position and opening into the side and bottom of said radially enlarged and spaced portion of said retaining means, and valve means in said diverting tube adjacent said retaining means adapted to selectively close said diverting tube, whereby 100% of the upward conveying capacity of said auger is effective to raise material above said retaining means when said retaining means is filled by closing said valve means, and whereby 100% of the material conveyed by said auger into said retaining means may fall through the enlarged and more widely spaced portion of said retaining means into said diverting tube by gravity when said valve means are open.

5. In combination with an upright screw conveyor having a conveyor tube with a helical screw auger rotatably mounted therein in close material advancing relation to the inside of said tube, material retaining means located intermediate of the ends of said tube and said auger and extending along at least one pitch turn of said auger and therearound, said retaining means being radially enlarged and more widely spaced from said auger than said tube through at least a substantial portion of the circumference of said tube providing space for material to be thrown radially by said auger and clear of the auger, an intermediate material diverting tube of at least equal cross sectional area to said conveyor tube disposed in downwardly directed position and opening into the bottom of said radially enlarged and spaced portion of said retaining means, and valve means adjacent said retaining means adapted to selectively close said diverting tube, whereby 100% of the upward conveying capacity of said auger is effective to raise material above said retaining means when said retaining means is filled by closing said valve means, and whereby 100% of the material conveyed by said auger into said retaining means may fall through the enlarged and more widely spaced portion of said retaining means into said diverting tube by gravity when said valve means are open.

References Cited by the Examiner
UNITED STATES PATENTS

| | | | |
|---|---|---|---|
| 164,715 | 6/75 | Caldwell | 198—213 |
| 2,173,414 | 9/39 | Fulton | 198—213 |

SAMUEL F. COLEMAN, *Primary Examiner.*

JULIUS E. WEST, WILLIAM B. LA BORDE,
*Examiners.*